United States Patent
DeFord et al.

(10) Patent No.: US 6,941,720 B2
(45) Date of Patent: Sep. 13, 2005

(54) COMPOSITE BUILDING MATERIAL

(75) Inventors: Harvey Dale DeFord, Rancho Cucamonga, CA (US); James A. Gleeson, North Curl Curl (AU); Donald J. Merkley, Alta Loma, CA (US)

(73) Assignee: James Hardie International Finance B.V. (NL)

( * ) Notice: Subject to any disclaimer, the term of this patent is extended or adjusted under 35 U.S.C. 154(b) by 0 days.

(21) Appl. No.: 09/973,844

(22) Filed: Oct. 9, 2001

(65) Prior Publication Data

US 2002/0139082 A1 Oct. 3, 2002

Related U.S. Application Data (60) Provisional application No. 60/239,155, filed on Oct. 10, 2000.

(51) Int. Cl.$^7$ .................................................. E04C 2/32
(52) U.S. Cl. ................................ 52/783.14; 52/309.12; 52/309.17; 52/783.17; 52/783.13; 52/783.15
(58) Field of Search ......................... 52/309.12, 309.17, 52/783.11, 783.17, 783.18, 783.19, 783.14, 783.13, 784.11, 783.15, 287.1

(56) References Cited

U.S. PATENT DOCUMENTS

| | | | |
|---|---|---|---|
| 2,443,961 A | | 6/1948 | Petalowski |
| 2,692,219 A | | 10/1954 | Slayter et al. |
| 3,231,657 A | | 1/1966 | Klousek |
| 3,284,980 A | | 11/1966 | Dinkel |
| 3,300,901 A | * | 1/1967 | Eckel .......................... 49/502 |
| 3,608,003 A | | 9/1971 | Klaue et al. |
| 3,817,013 A | * | 6/1974 | Selby ........................... 52/437 |
| 4,051,291 A | | 9/1977 | Long |
| 4,094,694 A | | 6/1978 | Long |
| 4,104,103 A | | 8/1978 | Tarullo |
| 4,105,739 A | | 8/1978 | Dave |
| 4,132,555 A | | 1/1979 | Barrable |
| 4,159,361 A | * | 6/1979 | Schupack ..................... 442/63 |
| 4,203,788 A | | 5/1980 | Clear |
| 4,232,494 A | | 11/1980 | Bauch et al. |
| 4,252,767 A | | 2/1981 | Piazza et al. |
| 4,263,752 A | * | 4/1981 | Jungbluth ..................... 49/501 |
| 4,265,979 A | | 5/1981 | Baehr |
| 4,279,695 A | | 7/1981 | Winterbottom |
| 4,312,822 A | | 1/1982 | Bonnet |
| 4,345,037 A | | 8/1982 | Fyles et al. |
| 4,361,616 A | | 11/1982 | Bomers |
| 4,411,723 A | | 10/1983 | Takeuchi |
| 4,434,119 A | | 2/1984 | Teare |
| 4,450,128 A | | 5/1984 | Takeuchi |
| 4,476,175 A | | 10/1984 | Forry et al. |
| 4,495,738 A | * | 1/1985 | Sheber ....................... 52/204.1 |
| 4,562,030 A | | 12/1985 | Sakaguchi et al. |

(Continued)

FOREIGN PATENT DOCUMENTS

| | | |
|---|---|---|
| AU | 515151 | 3/1981 |
| AU | 661704 | 4/1992 |
| DE | 3126242 | 1/1983 |
| WO | WO 01/26894 | 4/2001 |

*Primary Examiner*—Brian E. Glessner
(74) *Attorney, Agent, or Firm*—Knobbe Martens Olson & Bear LLP (57) ABSTRACT

This invention generally pertains to a composite building material comprising a lightweight core with a thin fiber cement facing on one side of the core and a second facing material on the other side. The fiber cement facing that is used on at least one of the faces of the building material is 3/16" or less, more preferably 1/8" or less. The green fiber cement facing is preferably formed by a slurry-dewatering process to form a sheet that is in a plastic, uncured, state prior to manufacture of the composite. The composite building material is assembled in an uncured state and then cured.

24 Claims, 6 Drawing Sheets

U.S. PATENT DOCUMENTS

| | | | |
|---|---|---|---|
| 4,600,637 A | | 7/1986 | Kafka et al. |
| 4,644,724 A | | 2/1987 | Schijf |
| 4,646,498 A | | 3/1987 | Schneller et al. |
| 4,647,496 A | | 3/1987 | Lehnert et al. |
| 4,725,491 A | * | 2/1988 | Goldfein .................. 428/312.4 |
| 4,743,414 A | | 5/1988 | Sudrabin |
| 4,852,316 A | | 8/1989 | Webb |
| 4,876,151 A | | 10/1989 | Eichen |
| 4,930,287 A | | 6/1990 | Volk et al. |
| 4,948,647 A | | 8/1990 | Burkard |
| 4,993,867 A | * | 2/1991 | Usow .......................... 404/89 |
| 5,002,620 A | | 3/1991 | King |
| 5,030,502 A | | 7/1991 | Teare |
| 5,209,968 A | | 5/1993 | Sweeney |
| 5,220,762 A | | 6/1993 | Lehnert et al. |
| 5,221,386 A | | 6/1993 | Ensminger et al. |
| 5,256,222 A | | 10/1993 | Shepherd et al. |
| 5,268,226 A | | 12/1993 | Sweeney |
| 5,366,600 A | | 11/1994 | Westhof et al. |
| 5,473,849 A | | 12/1995 | Jones, Jr. et al. |
| 5,508,082 A | | 4/1996 | Ehrat et al. |
| 5,519,971 A | | 5/1996 | Ramirez |
| 5,533,312 A | | 7/1996 | Mihalcheon |
| 5,552,187 A | | 9/1996 | Green et al. |
| 5,644,880 A | | 7/1997 | Lehnert et al. |
| 5,693,409 A | | 12/1997 | Gnatowski et al. |
| 5,704,179 A | | 1/1998 | Lehnert et al. |
| 5,738,924 A | | 4/1998 | Sing |
| 5,743,056 A | | 4/1998 | Balla-Goddard et al. |
| 5,791,109 A | | 8/1998 | Lehnert et al. |
| 5,817,262 A | | 10/1998 | Englert |
| 5,830,548 A | * | 11/1998 | Andersen et al. .......... 428/36.4 |
| 5,922,447 A | | 7/1999 | Baig |
| 5,922,788 A | | 7/1999 | Gotan |
| 5,989,335 A | * | 11/1999 | Soroushian et al. ........ 106/805 |
| 6,030,447 A | * | 2/2000 | Naji et al. .................. 106/718 |
| 6,061,993 A | * | 5/2000 | Bendixen et al. ........ 52/783.19 |
| 6,062,772 A | * | 5/2000 | Perkins ...................... 405/284 |
| 6,086,804 A | | 7/2000 | Akiyama et al. |
| 6,162,845 A | * | 12/2000 | Freed ......................... 523/122 |
| 6,185,891 B1 | | 2/2001 | Moore |
| 6,238,476 B1 | | 5/2001 | Sprinkle |
| 6,240,701 B1 | | 6/2001 | Moses et al. |
| 6,463,702 B1 | * | 10/2002 | Weaver et al. ............... 52/79.1 |
| 6,472,041 B1 | * | 10/2002 | Burke ......................... 428/86 |
| 6,484,888 B2 | * | 11/2002 | Miller ......................... 211/5 |
| 6,493,914 B2 | * | 12/2002 | Faza et al. .................. 29/33 Q |
| 2002/0162295 A1 | * | 11/2002 | Keshmiri ................... 52/653.1 |

* cited by examiner

COMPOSITE BUILDING MATERIAL

CROSS-REFERENCE TO RELATED APPLICATION

This application claims the benefit of U.S. Provisional Application No. 60/239,155, filed Oct. 10, 2000, the entirety of which is hereby incorporated by reference.

BACKGROUND OF THE INVENTION

1. Field of the Invention

This invention relates to a composite building material, and more particularly to a building material incorporating a lightweight core and one or more fiber cement skins formed on opposite sides of the core.

2. Description of the Related Art

Fiber-reinforced cement products such as water-resistant building sheets have been used for building since 1895. In recent history, reinforcing fibers used in such products have included not only asbestos fibers, but also cellulose (wood) fibers (see Australian Patent No. AU 515151), metal fibers, glass fibers and other natural fibers. Typically the density of such building sheets is from 1.2–1.7 g/cm$^3$, the variation in density typically being achievable by compression and dewatering of the fiber cement slurries used in manufacture, and by varying the amount of fiber used.

The densities of fiber cement described above mean the products are heavier than timber-based products of equal dimension and are more difficult to cut, machine and nail than timber and timber-based products. The density of lumber typically ranges from 0.7–0.9 g/cm$^3$ for dry hardwoods and from 0.38–0.6 g/cm$^3$ for dry softwoods. Thus, a fiber cement material of density similar to lumber would enable products to be manufactured that were lighter, more nailable, easier to cut, and easier to machine, while retaining the durability, fire-resistant, rot-resistant, and water-resistant properties of fiber cement.

SUMMARY OF THE INVENTION

Fiber cement building materials are commonly installed to external surfaces of building envelopes. The outside surface of the fiber cement product is exposed to local weather conditions and is subjected to stresses brought about by changes in temperature and humidity, UV exposure, and exposure to pollutants and carbon dioxide in the atmosphere. A building product that has the exterior durability, planar strength, and the resistance to moisture degradation of fiber cement on the outside surfaces, along with a modified core to provide one or more special properties to the composite, is desired. The special properties may include, but are not limited to:

Lighter weight for ease of handling of full sheets and long lengths of product,

Ease of cutting similar to gypsum wallboard to ensure quick and easy installation of the product by score-and-snap cutting with a utility knife, Low thermal conductivity for insulation of walls in building structures from the outside environmental conditions, Thermal fire insulation and low thermal shrinkage to provide resistance to the progression of heat and fire through building walls and ceilings, Low moisture transmission to control and direct moisture flow and permeation of water and moisture into building walls, ceilings and roofs, and Low acoustic transmission and high acoustic absorption to reduce noise transmission throughout rooms in a building.

The desired properties can be achieved with a sandwich composite design using fiber cement facing on a core having a composition tailored for the specific properties.

This invention in one embodiment generally pertains to a composite building material comprising a lightweight core with a thin fiber cement facing material or fiber cement skin bonded to one side of the core and a second facing material bonded to the other side. The fiber cement facing that is used on at least one of the faces of the building material is preferably less than about 3/16" thick, more preferably less than about 1/8" thick. Thinner skins provide an overall light composite because the skin material is of higher density than the core material. The fiber cement facing is preferably in a preformed green (uncured) state at the time of assembly of the skins and the core into the sandwich composite.

It is an object of this invention to produce composite building materials that can be designed specifically for applications such as but not limited to tile backer, wallboard, wall panel, siding, trim, sheathing, decking, flooring, structural members, fencing, roofing, roof decking, or substrates thereof. The bulk of the physical properties (strength, durability, etc.) can be tailored by varying the composition of the facing material and/or the core. The fabrication of composites with a particular set of mechanical properties can be done with the proper choice of facing material and thickness. The density of the composite can be reduced by foaming the core slurry and/or by adding low-density filler materials. The uncured fiber cement facings are preformed and preferably continuous in length. The use of continuous, preformed fiber cement facing sheets simplifies the manufacture of the composite since only the core composition is cast, instead of casting one each for the core and for the facing. Also, the use of continuous, preformed fiber cement facing sheets eliminates the need for separate carrier sheets.

It is a further object to produce composites with improved properties by co-curing the core and facings. Manufacturing with uncured fiber cement sheet offers greater flexibility in the surface texture, surface profile, corner profile, and composite properties. Penetration of the core slurry into the uncured fiber cement facing and subsequent co-curing of the core and skins produces superior interlayer bonding, resulting from mutually interpenetrating mechanical and chemical bonding. The bonding can be further improved with a cementitious bonding layer applied to the core side of the facing. Controlling the water content and/or degree of pre-cure of the green sheets to enable sufficient penetration of the core slurry into the void network of the sheet enhances interlayer bonding. This leads to stronger mechanical interlock and chemical bonding after curing. Also, antifoaming agents, thickening agents, or other additives in the uncured facing can be used to collapse the foam at the facing-core interface. This leads to the formation of a dense interlayer that enhances bonding by increasing the surface area of contact between the core and facing. This prevents the occurrence of delaminations that would greatly reduce the strength and durability of the composites.

In one aspect of the present invention, a building material is provided comprising at least a first component and a second component provided adjacent the first component. The first component is provided as pre-formed, uncured fiber cement, wherein the fiber cement is reinforced with individualized fibers. The uncured fiber cement is cured after providing the first component adjacent to the second component.

In one preferred embodiment, the building material is provided comprising a lightweight, cement-containing, low cost core having a first side and a second side. A pre-formed fiber cement facing is provided on at least the first side of the core. The fiber cement facing is reinforced with individualized fibers, the fibers having a substantially planar orientation. The core and the facing are simultaneously cured to form the building material.

In another aspect of the present invention, a method of manufacturing a building material is provided. A fiber cement component of predetermined size and shape is preformed such that the fiber cement component is in a plastic state and is uncured. A second component made from a curable material is formed adjacent the fiber cement component. At least the fiber cement component is cured while adjacent to the second component to form the building material.

In one preferred embodiment, the fiber cement component is a fiber cement skin, and the second component is a lightweight cementitious core having a first side and a second side. The fiber cement skin is positioned adjacent a first side of the cementitious core. The fiber cement skin and the lightweight cementitious core are simultaneously cured to form the building material.

BRIEF DESCRIPTION OF THE DRAWINGS

FIG. 3C shows a horizontal (open void cells are parallel to the skins), single corrugated core layer.

FIG. 4 shows a sandwich panel with a solid core. The first facing (10) covers one face and both sides and overlaps both side edges of the opposing face.

DETAILED DESCRIPTION OF THE PREFERRED EMBODIMENTS

1. Composite Structure and Composition

Figure 1:
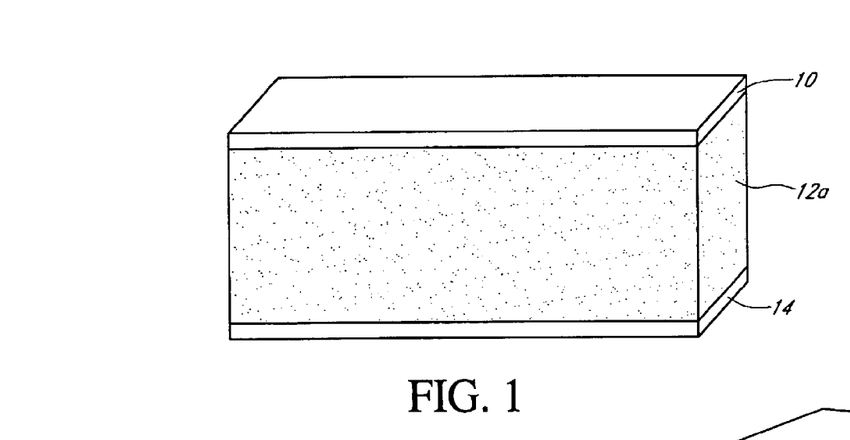
FIG. 1 shows a cross-section of a 3-layer sandwich composite, comprising 2 facing layers or skins and a solid core.
Figure 2:
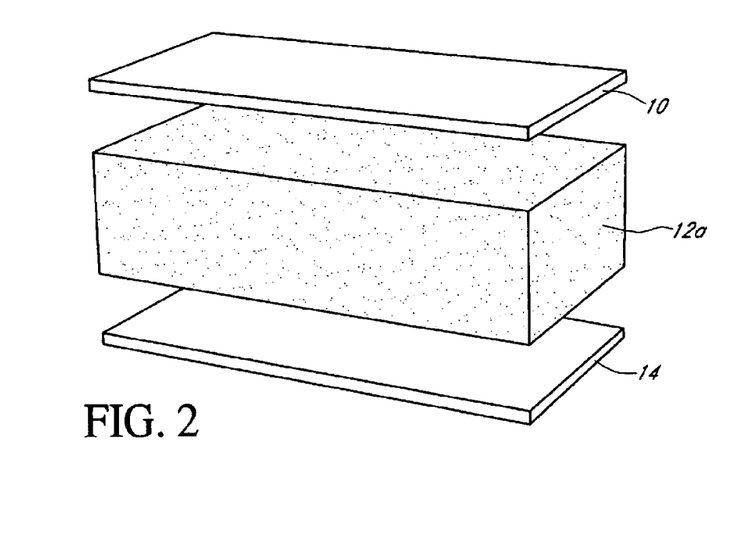
FIG. 2 shows and exploded view of a 3-layer sandwich composite, comprising 2 facing layers or skins and a solid core.

A preferred embodiment of the composite building material is shown in FIG. 1. The composite is preferably comprised of a lightweight core (12a), a fiber cement outer layer, skin or facing (10), and a second outer layer, skin or facing material (14). As used herein, the terms skin, facing, or outer layer are interchangeable. It will be appreciated that the use of facings and a core to form a composite is only one embodiment of the present invention, and thus, other building materials can be provided incorporating the concepts described herein without being limited to a core having a facing on one or both sides thereof.

The lightweight core in one embodiment is comprised of a hydraulic cementitious binder, fillers, fiber, and foam and/or lightweight additives, as described further below. The fiber cement facing material (10) in one embodiment is comprised of hydraulic cementitious binder, filler, fiber, and additives. The second facing material in one embodiment is selected from a group that includes thin fiber cement, fibrous mats, paper, and polymeric coatings.

The embodiments of FIGS. 1–3C consist of a composite building material comprising three primary layers through the cross section of the composite material perpendicular with the main planar axis of the composite:

A first layer of fiber cement on at least one face of the building composite (10), A middle layer of core material (12a to 12d), A second layer of either fiber cement or an alternate facing material on the opposite face or any combination of the remaining faces of the composite not faced by the first layer of fiber cement (14).

These embodiments may also have sub layers within or between the primary layers to provide improved interfacial bonding or provide other special functions to the composite. These sub layers or interlayers may also contain an embedded reinforcing material embedded in the layer, the reinforcing material being typical of materials described herein as the second outer layer.

Figure 5:
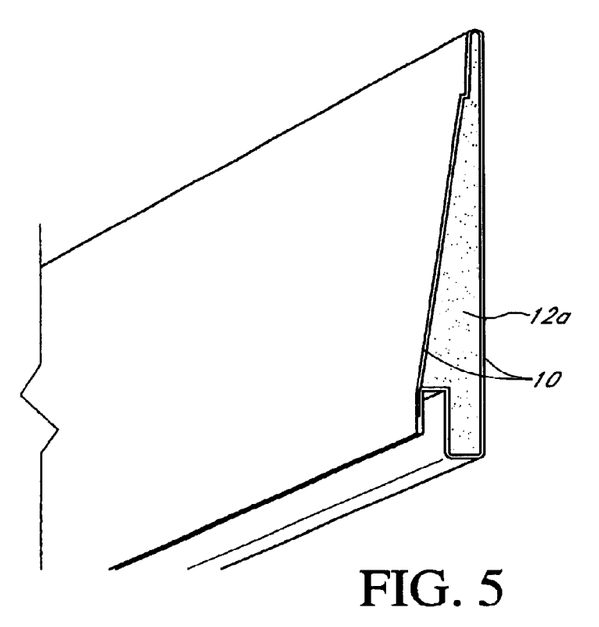
FIG. 5 shows a plank with a solid core and a first facing that envelops the faces and sides.
Figure 6:
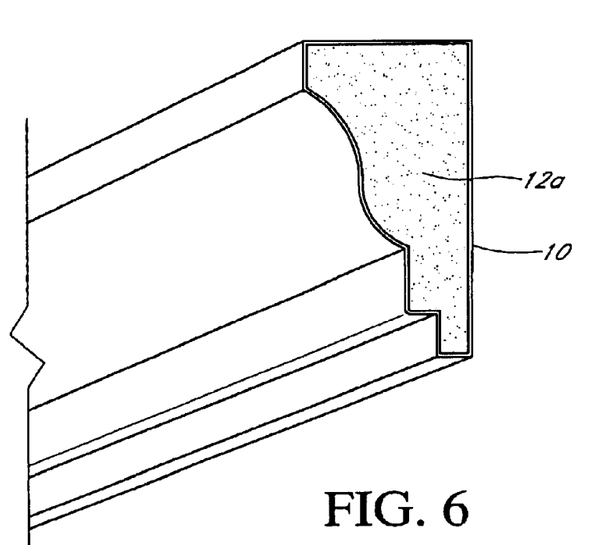
FIG. 6 shows a trim board with a solid core and a first facing that envelops the faces and sides.

It should be noted that the facings can be applied to any of the faces or sides of the core and are not restricted to the large primary faces of the composite. FIGS. 5 and 6, for example, show a plank and trim board, respectively, that have fiber cement facings (10) applied substantially entirely around a core as used in a plank and trim board, respectively. The surface of the fiber cement layer can be shaped, embossed or patterned if needed for aesthetics or functionality.

a. Materials for the Fiber Cement Outer Layer, Skin, or Facing

The fiber cement skin formulation in one embodiment preferably comprises:

a hydraulic binder, preferably present in a concentration of about 10–80 wt %, more preferably about 20–50 wt %, and most preferably about 25–40 wt %;

a filler material, preferably present in a concentration of about 0–80 wt %, more preferably about 40–70 wt %, and most preferably about 45–65 wt %;

fiber, preferably present in a concentration of about 1–25 wt %, more preferably about 2–16 wt %, and most preferably about 5–12 wt %; and additives preferably present in a concentration of about 0–20 wt %, more preferably about 0–10 wt %, and most preferably about 0–6 wt %.

The hydraulic binder used in the fiber cement is preferably Portland cement but can also be any hydraulic cementitious binder chosen from a group including, but not limited to: high alumina cement, ground granulated blast furnace slag cement, gypsum hemihydrate, gypsum dihydrate, and gypsum anhydrite, or any mixtures thereof.

The filler, which can be reactive or inert material, is preferably ground silica sand but can also be any material chosen from the group including, but not limited to: amorphous silica, diatomaceous earth, rice hull ash, silica fume, microsilica, hollow ceramic spheres, geothermal silica, blast furnace slag, granulated slag, steel slag, fly ash, mineral oxides, mineral hydroxides, clays, magnesite or dolomite, metal oxides and hydroxides, polymeric beads, or any mixtures thereof.

The fiber cement additives can be chosen from a group including, but not limited to: silica fume, hollow ceramic spheres, cenospheres, geothermal silica, fire retardants, set accelerators, set retarders, thickeners, pigments, colorants, plasticizers, dispersants, foaming agents, flocculating agents, water-proofing agents, organic density modifiers, aluminum powder, kaolin, alumina trihydrate, mica, metakaolin, calcium carbonate, wollastonite, mineral oxides, mineral hydroxides, clays, magnesite or dolomite, metal oxides and hydroxides, pumice, scoria, tuff, shale, slate, perlite, vermiculite, polymeric beads, calcium silicate hydrate and polymeric resin emulsions, or any mixtures thereof. Preferred polymeric resins are products such as, but not limited to, acrylic latexes, styrene-butadiene latexes, or mixtures thereof. These latexes can be emulsions or be in a redispersible powder form. In portland cement-based materials, the latexes need to be stabilized to withstand the high-alkali environment.

The fibers used in the fiber cement are preferably cellulose wood pulp but can also be natural or synthetic organic or inorganic fibrous material chosen from the group including, but not limited to: ceramic fiber, glass fiber, glass ceramic fiber, natural fibers such as kenaf, hemp, flax and jute, carbon fiber, mineral wool, steel fiber, synthetic polymer fibers such as polyamides, polyesters, polypropylene, polymethylpentene, polyacrylonitrile, polyacrylamide, viscose, nylon, PVC, PVA, and rayon, or any mixtures thereof.

When cellulose fibers are used, they are preferably unrefined/unfibrillated or refined/fibrillated cellulose pulps from sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibers can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments.

The cellulose fibers used for reinforcing cement composite materials are predominantly individualized fibers with partial or complete removals of lignin components from the fiber cell walls. In one embodiment, at least 90% of the lignin components are removed from the fiber cell walls. These fibers are preferably prepared by chemical pulping methods, which rely mainly on the effects of chemicals to separate fibers. Based on the chemicals utilized in the process, the chemical pulping methods are classified as Soda, Kraft, Kraft-AQ, Soda-AQ, Oxygen Delignification, Kraft-Oxygen, Organic Solvent methods, and Sulfite pumping, steam explosion pulping or any other pulping techniques. In the chemical pulping process, lignin, which acts as glue holding cellulose and hemicellulose together to provide mechanical strength in the wood, is broken and dissolved by chemical reactions.

These chemical reactions are usually carried out in a reactor, often called a digester, under a high temperature around 150 to 250° C. for about 30 minutes to 2 hours. The cleavage of the bonds between lignin and cellulosic components results in weakening of the bonds among fibers. With aids of mild mechanical forces, cellulose fibers are then separated into individual fibers. By far the most common process for individualized fiber used in fiber cement composite materials is the Kraft process.

The fibers are more preferably fibrillated cellulose fibers, such as described in Australian Patent No. AU 515151 and Applicant's copending application entitled FIBER CEMENT COMPOSITE MATERIALS USING SIZED CELLULOSE FIBERS Ser. No.: 969742, filed Oct. 2, 2001, the entirety of which is hereby incorporated by reference. This application also describes other materials that can be used for the binder, filler or aggregate and additives, as well as various methods that may be employed in fabricating the article.

Fibrillation of the fibers involves first dispersing the fibers in water. This is preferably carried out in a hydrapulper of the kind commonly used in the paper making industry. A disc-type cellulose refiner is preferably used to abrade, shred, or fray the fibers to produce short, hair-like fibrils or tendrils radiating from fine fiber strands. This process significantly increases the exposed surface area that is available for bonding when incorporated into a cementitious matrix. This fiber morphology enables improved fiber-matrix bonding which results in improved strength and improved impact and abuse resistance. This improved, more efficient reinforcement per unit volume of fiber added reduces the volume addition of fiber needed to attain a given performance level. This reduction in needed fiber content can significantly reduce raw material costs since cellulose fibers cost substantially more than the other fiber cement components.

In one embodiment, the fibers are dispersed at a consistency of about 1% to 6% in a hydrapulper, which also imparts some fibrillation. Further fibrillation can be achieved using a refiner or series of refiners. Once dispersed, the fibers are then fibrillated to a range of about 100 to 750 degrees of CSF (Canadian Standard Freeness), more preferably between about 100 to 650 degrees of CSF, more preferably between about 180 to 650 degrees of CSF. Dispersion and fibrillation can also be achieved by other techniques such as hammer-milling, deflaking, refining, shredding, and the like. Furthermore, use of fibers without fibrillation is also acceptable for some products and processes. In another embodiment, processing further comprises flash drying the fibers to a moisture content of about 5% to 50% using conventional flash drying systems.

The orientation of the fibers in the facing layers of fiber cement is preferably parallel to the planar layers of the material and this planar orientation raises the tensile strength of the skins 10 to 20% compared to random-oriented fiber in fiber-reinforced cement and concrete facings. More preferably, the fibers are substantially oriented in the direction of loading. It will be appreciated that the fibers can also be aligned in different planes to correspond to the desired direction of loading. The utilization of planar-oriented fibers is a more economical use of fiber. This is because fiber is more expensive than the inorganic matrix materials. Less fiber is needed to achieve the desired strength and the product is more durable because the more durable matrix component is less diluted by fiber. Again, as described above, preferred fibers for fiber cement facings are cellulose fibers that have been dispersed and fibrillated prior to manufacture of the facings. These discrete or individualized fibers have greater surface areas available for bonding to cementitious materials due to the fibrillation process. This higher degree of bonding per unit volume of the fiber cement leads to higher strengths and enhanced durability.

The discrete or individualized fibers are proportionally mixed with the other ingredients to form a mixture which can be a waterborne slurry, or a semi-dry paste, depending on the fabrication process to be used. In one embodiment, the cellulose fibers are mixed with cement, silica, a density modifier and other additives in a well-known mixing process to form a slurry or paste. In the mixer, regular cellulose fibers and/or natural inorganic fibers, and/or synthetic fibers can be blended with the engineered fibers, such as described in Applicant's above-referenced application entitled FIBER CEMENT COMPOSITE MATERIALS USING SIZED CELLULOSE FIBERS.

The fiber cement facing material may be formed into a shaped article from a plastic mixture or an aqueous slurry, with or without post pressing, by a number of conventional processes such as the:

Hatschek sheet process;
Mazza pipe process;
Magnani process;
Injection molding;
Extrusion;
Hand lay-up;
Molding;
Casting;
Filter pressing;
Fourdrinier forming;
Multi-wire forming;
Gap blade forming;
Gap roll/blade forming;
Bel-Roll forming;
Wellcrete
Others.

These processes may also include post-forming processes such as pressing, embossing and others, after the article is formed but before the article is cured. The processing steps and parameters used to achieve the final product using a Hatschek process are similar to what is described in Australian Patent No. 515151. Thus, after the processing described above, the formed article is in a plastic state, enabling it to retain its shape and be capable of molding, but is not yet cured. Curing of the article, as described below, preferably occurs simultaneously with the core material.

b. Core Structure and Material

Figure 3A:
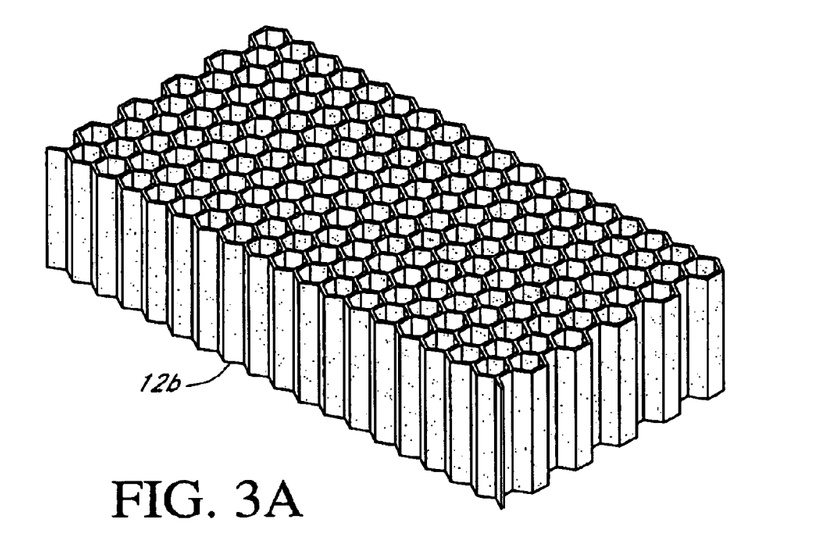
FIGS. 3A to 3C show examples of three of the many structural configurations that can be used for open-core composites. A vertical (open void cells are perpendicular to the skins) honeycomb core configuration is shown in FIG. 3A. A vertical configuration composed of symmetrically opposed corrugated core layers is shown in FIG. 3B.
Figure 3B:
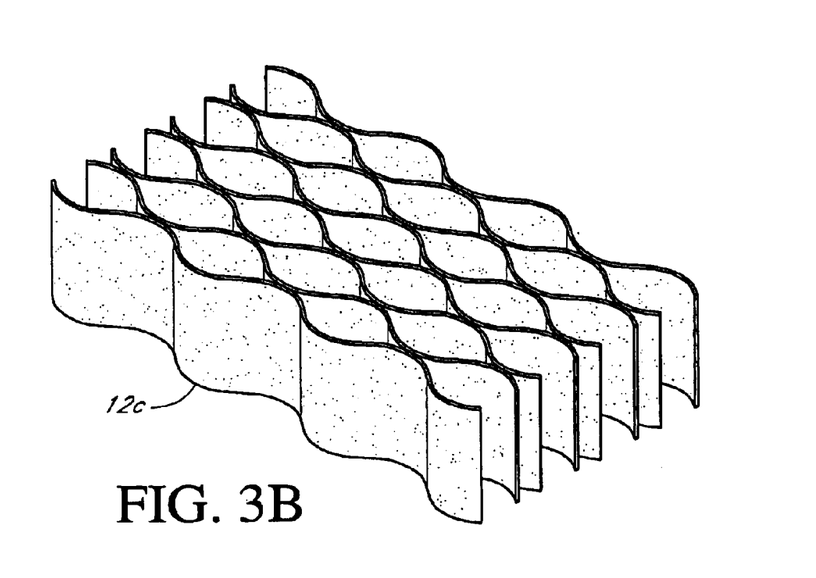
Figure 3C:
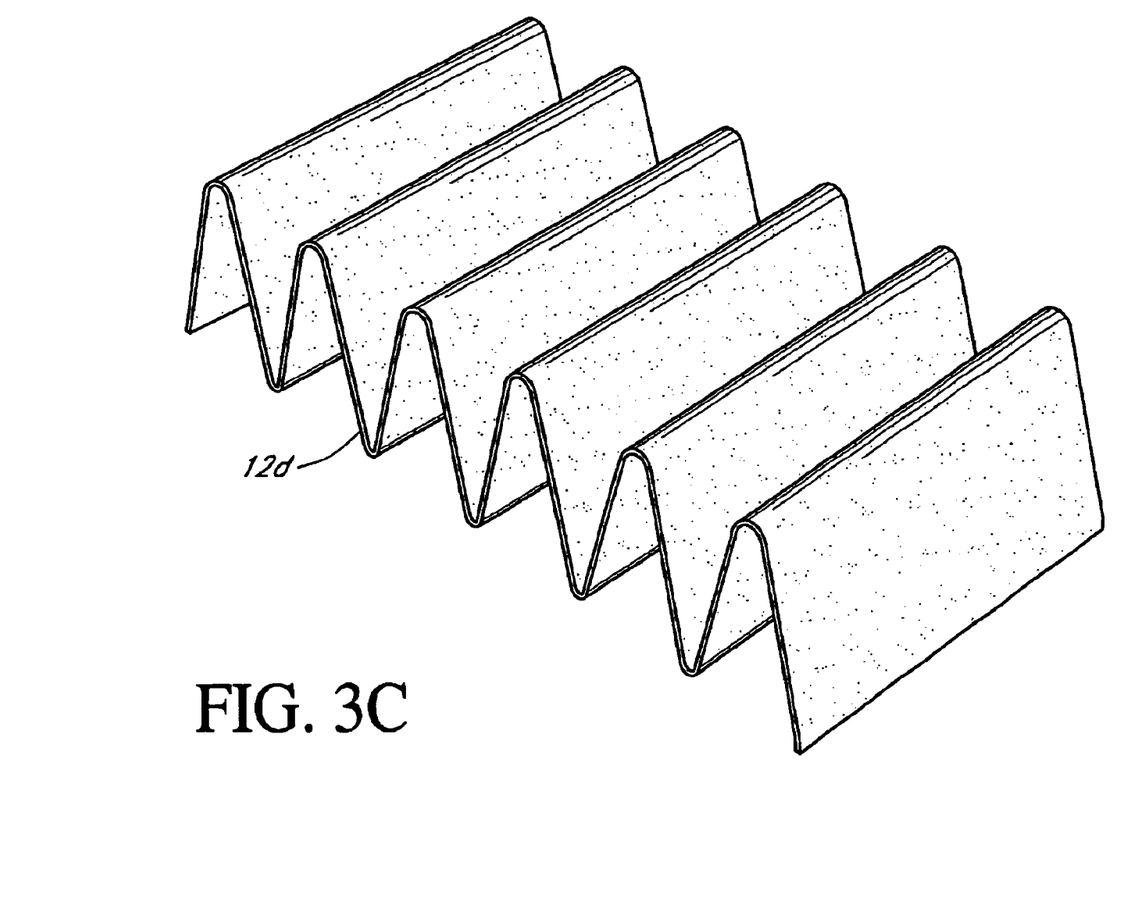
Figure 4:
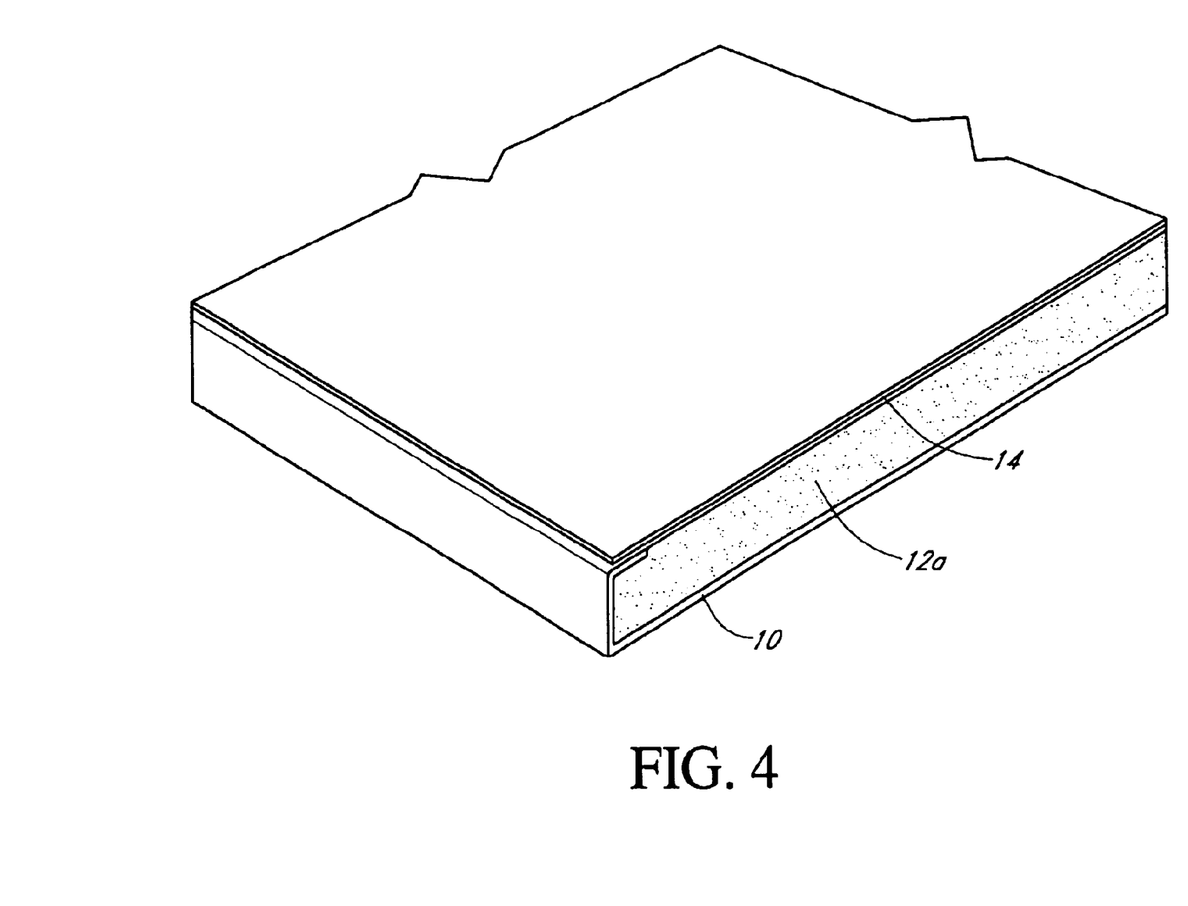

The core structure can be that of either a solid core (element 12a in FIG. 1 and FIG. 2) or an open core (elements 12b, 12c, and 12d in FIGS. 3A, 3B, and 3C, respectively). Alternatively, the core can be considered to be homogeneous or non-homogeneous (i.e., the core is itself a composite). One or a combination of the following methods can be used to reduce the composite density:

by assimilating large volumes of foam, with a bubble size preferably in the range of about 0.02–1 mm, into the core slurry (solid core structure), by adding large volumes of low density materials to the core slurry (solid core structure), or by forming the core with structural reinforcing material in such a way as to form an open network having a large void volume (structural porosity, with void dimensions typically ranging from about 10% to 90% or more of the core thickness), but with a structural design that produces adequate core strength (open core structure).

Large volumes of foam can be introduced to the core by adding foaming agents directly to the slurry and foaming in situ, or preferably by adding foam from a foam generator. Voids can also be formed by adding a reactive gas-forming metal powder to the alkaline cementitious slurry, such as aluminum powder, to generate gas voids. Low-density additives are added directly to the slurry and require no additional processing. Fabrication of an open core structure involves construction of the core prior to assembly of the composite.

For the open core structural design, the core is preferably made from a strong material in a shape and orientation that structurally reinforces and supports the facing materials. The objective is to create the strength and stability of a monolithic sandwich composite using an open structural design that incorporates large volumes of void space to reduce the composite weight. Such structural designs include open honeycombs and corrugations. The axis of the reinforcing core structure can be oriented either parallel or perpendicular to the planar axis of the composite. The structural reinforcing material can be made from fiber cement of a composition and process described above, or other cost-effective, rigid materials such as plastic, fiber-reinforced plastic, metal, or cardboard material of a wall thickness preferably ≦¼ inch. A preferred method of producing open structural core designs such as honeycombs or other multi-celled structures is by extrusion. Another preferred embodiment is a co-extrusion of the core and facing material.

The solid core formulation in one embodiment comprises:

a binder, preferably present in a concentration of about 10–100 wt %, more preferably about 20–50 wt %, and most preferably about 25–40 wt %;

voids, formed by foaming the slurry, preferably in a size range of about 0.02–1.0 mm and present in a concentration of about 0–80 vol %, more preferably about 20–70 vol %, and most preferably about 25–50 vol %;

a filler material, preferably present in a concentration of about 0–80 wt %, more preferably about 40–70 wt %, and most preferably about 45–65 wt %;

fibers, preferably present in a concentration of about 0–5 wt %, more preferably about 0.25–2.0 wt %, and most preferably about 0.5–1.0 wt %; and additives and admixtures preferably present in a concentration of about 0–20 wt %, more preferably about 0–10 wt %, and most preferably about 0–6 wt %.

The solid core composition preferably includes foam, fillers, additives, and admixtures desired for core properties, and can be bound together by either organic (polymeric) or inorganic binders. The polymeric binders can be foamed or unfoamed and can contain fillers. The preferred binder to use in these materials is an inorganic, hydraulic binder chosen from the group including, but not limited to, Portland cement, high-alumina cement, ground granulated blast furnace slag cement, gypsum hemihydrate, gypsum dihydrate, gypsum anhydrite, or any mixtures thereof. More preferably the binders are Portland cement, gypsum hemihydrate, gypsum dihydrate, gypsum anhydrite, or any mixtures thereof.

Admixtures for the solid core slurries include viscosity modifiers, accelerators, retarders, foaming agents, and dispersing agents. Lightweight aggregates or fillers are used in addition to or in place of foaming agents to reduce core density. Lightweight fillers include expanded minerals such as perlite, vermiculite, shale, and clay, expanded polystyrene spheres, and fly ash. Moisture resistant additives used individually or in combination in these cores include emulsions of wax and/or asphalt, polyvinyl alcohol, siloxane emulsion, metallic soaps and stearates. Films or resinous coatings formed by such materials as styrene-acrylic latex can be used to further improve moisture resistance and surface quality. Additives used to improve fire resistance include gypsum, mineral fibers such as glass and wollastonite, mineral additives such as unexpanded vermiculite, mica, hydrated alumina, bauxite, clay, and any combinations thereof.

Other materials that can be used for the core include those described for the facing material above, those described in the section entitled "Overview of Other Sandwich Composite Embodiments," as well as those described in the above-referenced application entitled FIBER CEMENT COMPOSITE MATERIALS USING SIZED CELLULOSE FIBERS.

c. Materials for the Second Outer Layers, Skin, or Facing

The second layer, or skin, if used, can be supplied in any generally planar form, such as a continuous fibrous or fiber-reinforced composite sheet, mat, plate, film, or coating, and can be made from substances such as metals, plastics, wood, paper, organic or inorganic fibers, cementitious or non-cementitious binders, fillers, additives, or combinations thereof. Preferred non-cementitious binders include but are not limited to polymers such as acrylic and styrene-butadiene latexes. In one embodiment, the second facing is fiber cement manufactured like the first facing described above. In another embodiment, the second facing is made of a different material from the first facing. The preferred materials to be used for the second skin include thin fiber cement, fibrous mats, paper, continuous strand two-dimensional mats, and polymeric coatings. The preferred fibrous mats are made from fiberglass, and can be either nonwoven (veils) or woven (scrims) using continuous or chopped fibers. The glass fibers are preferably alkali resistant or polymer coated. The surface of the second layer can be shaped, embossed, or patterned if needed for aesthetics or functionality. Other examples that can be used for the second facing are described in the section below entitled "Overview of Other Sandwich Composite Embodiments."

d. Composite Processing

It is preferred that after the manufacture of the components above, the composite is cured sufficiently to attain a minimum level of stiffness before subsequent processing. If a minimum level of strength is not attained, the physical manipulation required for process handling, cutting, and stacking can cause damage such as cracking within the core or delamination at the core-skin interface. Depending on the formulation, the composite can be air-cured, elevated-temperature cured, steam-cured, carbonated, or pre-cured and then autoclaved, or can be cured by combinations thereof. The length of time needed for composite stiffening and the temperature-time schedule needed for adequate curing is dependent on the formulation, the manufacturing process, and the size and shape of the composite. These factors can be adjusted with the use of set-controlling admixtures and/or adjusting processing parameters such as temperature. It will be appreciated that curing as described herein includes not only the curing of cementitious materials, but also includes non-cementitious materials that set over time (e.g., polymers).

In one embodiment, an uncured fiber cement facing is preferably pre-formed by a slurry-dewatering process, such as the Hatschek process, to form a sheet that is in a moldable and uncured state prior to manufacture of the composite as described above. The composite building material is preferably assembled in an uncured state and then cured. The composite in one embodiment may preferably first be pre-cured in a pre-cure chamber at elevated temperature and relative humidity, or in a pre-cure chamber at elevated temperature and low humidity. Or preferably, the pre-curing is done for up to 80 hours at ambient temperature, most preferably 24 hours or less. The article can then be air-cured, in one embodiment, for approximately 30 days. More preferably, the pre-cured article is autoclaved at an elevated temperature and pressure in a steam saturated environment at about 60 to 200° C. for about 3 to 30 hours, more preferably about 24 hours or less. The time and temperature chosen for the pre-cure and cure processes are dependent on the formulation, the manufacturing process, the process parameters, and the final form of the product.

It will be appreciated that although the embodiments above describe simultaneous curing of the fiber cement facing and the core, the curing need not be done simultaneously. In other embodiments, curing can be performed consecutively or sequentially when the core and the fiber cement cure in different times. Moreover, the core can also be made of a material that does not require curing. In these embodiments, only the fiber cement component is cured. It will also be appreciated that the fiber cement can be partially cured or dried prior to forming the composite building material.

Manufacturing of the composite is done with an uncured fiber cement sheet to produce stronger interfacial layer bonding to resist or essentially eliminate core-skin delaminations during handling, cutting, installation, and service. Co-curing of the core and skins produces a mutually inter-penetrating mechanical and chemical bonding between the core and fiber cement skin. This type of bonding is stronger and more durable compared to forming the composite using cured fiber cement skins and does not require adhesive to bond the layers together. An accelerated hydraulic binder is preferably used to speed up continuous processing and enable higher throughput. The use of fiber cement facings gives the composite excellent moisture and abuse resistance. Good fire resistance can be obtained by the use of additives that effectively slow fire thermal conduction and control the permeability of the microstructure. The composites can also be designed to have interlayers, comprised of organic or inorganic materials or mixtures thereof, that provide special functionality such as by improving core-skin bonding, moisture control, thermal insulation, and fire protection.

The use of accelerating agents results in rapid stiffening desired for the high speed, continuous production of the composites. Penetration of the accelerants in the core slurry into the uncured facings during manufacture can accelerate the cure of the fiber cement facings. High production rates require the rapid stiffening of the composite to enable handling for cutting and stacking without collapse of the cores or damage to the composites.

The use of preformed, uncured fiber cement skins offers a number of advantages as outlined below: First, improved skin-core bonding resulting from mutually interpenetrating mechanical and chemical bonding. This improved bonding produces higher bending strengths because this type of bonding is stronger and more durable than the predominantly mechanical bonding that occurs between cured fiber cement and the core found in the prior art. In addition, the improved bonding results in improved resistance to or elimination of core-skin delaminations that can occur during handling, cutting, installation, and service.

The use of pre-formed, uncured fiber cement skin also results in reduced manufacturing time. The uncured skins can be concurrently manufactured and shaped, imprinted, or embossed prior to assembly of the composite. An uncured bottom skin can also act as a carrier sheet and, by bending the flexible skin material upward at the edges, it can act as a mold for the core material, enabling continuous production of the composite.

The methods and formulations described above also improve skin-core interlayer formation. Admixtures such as anti-foaming agents in the uncured fiber cement skin can cause collapse of the foam structure at the skin-core interface to produce a dense interlayer that has a higher contacting surface area, resulting in a stronger bonding of the core to the skin. Also, careful control of the water content in the uncured skins can be used to help control the thickness of the dense interlayer that is formed. Drier skins wick more water from the core slurry and cause more collapse of the foam structure at the skin-core interface, resulting in a denser, thicker interlayer. A dense interlayer material can be applied to the core side of the fiber cement skin before assembly to further improve core-skin bonding.

Improved skin curing and skin properties also result from the embodiments described above. Admixtures such as accelerating agents in the core slurry can be wicked into the fiber cement capillary network and accelerate the curing of the fiber cement skins. Cementitious material in the core slurry can be wicked into the fiber cement skin capillary network and substantially reduce the permeability of the fiber cement material by filling the capillaries with cementitious reaction products. This process has unexpectedly resulted in reductions of fiber cement permeability by as much as 95%.

e. Other Types of Composite Building Materials

It will be appreciated that the sandwich type composite materials described herein represent only one embodiment of the present invention, and thus, other types of composite building materials can also be made incorporating a pre-formed, uncured fiber cement component.

Figure 7A:
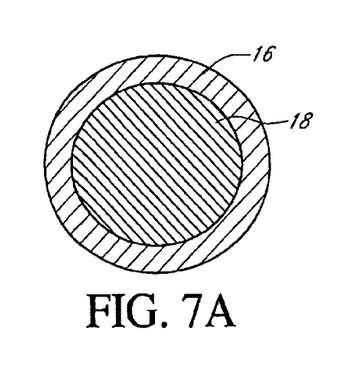
FIGS. 7A–7G show cross-sectional views of additional composite products that can be made in accordance with preferred embodiments.
Figure 7B:
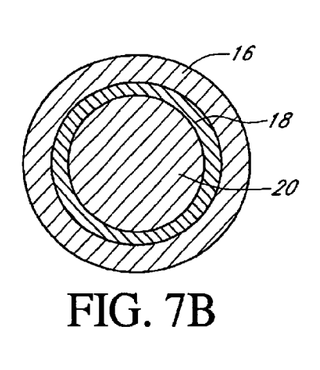
Figure 7C:
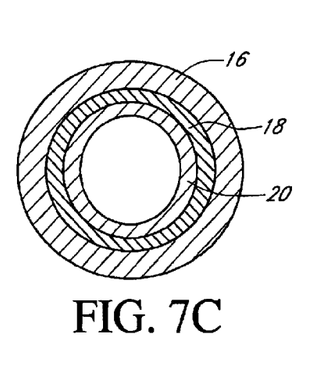

FIG. 7A illustrates one embodiment of a building material having a circular cross-section, wherein a lightweight material 16 such as described above surrounds a fiber cement component 18 such as described above. As shown in FIG. 7A, the fiber cement component 18 may be solid, or as shown in FIGS. 7B and 7C, the fiber cement component 18 can be annular. In FIG. 7B, a lightweight core 20, which may be the same material or different material from the outer component 16, is provided within the fiber cement component 18. In FIG. 7C, this core 20 can also be annular to define a hollow region of the building material therewithin.

Figure 7D:
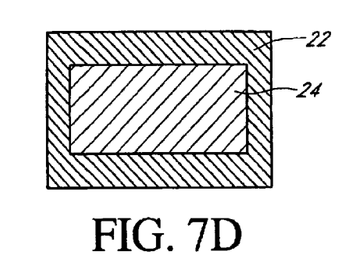
Figure 7E:
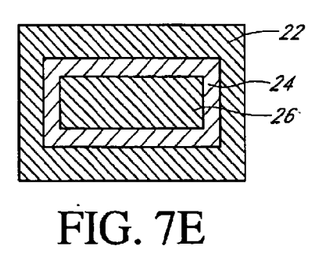
Figure 7F:
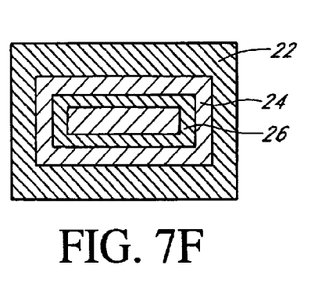

It will be appreciated that the components 16 and 18 in FIGS. 7A–7C can be switched, such that the fiber cement component surrounds a lightweight core. Moreover, as shown in FIGS. 7D–7F, the building material need not be circular in shape, but can assume many other forms as well. FIGS. 7D–7F illustrate one embodiment in which a rectangular core of lightweight material 24 is surrounded by a fiber cement facing 22 that extends all the way around the lightweight core 24. This facing 22 need not extend all the way around the core 24, but can also extend only partially around the core.

Further embodiments are illustrated in FIGS. 7E and 7F, wherein a core 26 is provided surrounded by two facing layers 24 and 26, one of which may be fiber cement as described above and the other of which can be the same or other material. In FIG. 7F, it is illustrated that the core 26 can be hollow.

Figure 7G:
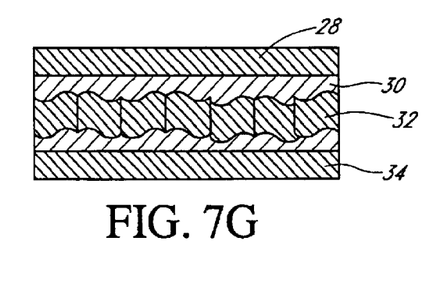

FIG. 7G illustrates another embodiment wherein a lightweight core 30 is sandwiched between two facing layers 28 and 34, which may be fiber cement facings such as described above. The core 30 may be a composite material itself, reinforced with an exemplary reinforcement 32, which may be fibers or other materials.

2. Examples of Preferred Fiber Cement Skin Building Materials

One preferred embodiment of the invention comprises a building material made from a lightweight, cement-containing, low-cost core which is at least partially surrounded by a fiber cement skin of thickness of less than about 3/16" thick, which when cured, is of high durability when exposed to sunlight, water, and atmospheric gases.

The bonding between the fiber cement skin and the lightweight core is cementitious. The thin, uncured fiber cement skin is capable of being bent, folded, or profiled. Parts of the core surface that are not exposed to external weathering conditions may be left unfaced or faced with another sheet material herein described as the second outer layer, as desired.

The composite preferably has one or more of the following improved attributes, including lower cost, durability and workability (including handling, cutting to shape, and fixing). Moreover, multifunctional performance is accomplished incorporating any combination of strength, abuse resistance, fire, acoustical transmission, and aesthetics by the use of sandwich composites as described above. In terms of manufacturability, the use of thin green sheet allows the skin to form a shapeable mold for the core. Additives enable the core and skin to be rapidly and controllably cured to form a cementitiously bonded monolith.

The use of pre-formed, uncured fiber cement skins in the production of sandwich composite boards is also far more efficient than using cured fiber cement skins. The use of cured fiber cement skins requires either the use of molds to contain a flowable core slurry, or the use of a non-flowable core mix which would have to be compacted to attain a planar profile. Either of these methods would considerably reduce production rates.

The plastic properties of the thin, preformed, green fiber cement skin of the preferred embodiments also enable the skin to be wrapped around corners to form rectangular or profiled shapes not possible with cured fiber cement skins.

The multifunctional performance of these embodiments stems from the combination of the desired attributes of fiber cement, such as non-combustible, low flame spread, rot resistant, mold and fungus resistant, termite resistant, finished exterior surface for painting, exterior durability, resistance to degradation by moisture weather resistant, abuse resistant, with additional functional attributes derived from a synergistic combination of composite design and materials, such as:

shear strength of a framed wall similar to plywood and OSB sheathing, fire resistance of a framed wall similar to type X gypsum wallboard, thermal insulation similar to foamed plastic, structural adequacy for partition walls similar to engineered wood panels, acoustic absorption or low acoustic transmission, ability of the composite to be molded due to the plastic state of the fiber cement skin to form folded corners, architectural profiles, or to make a full wrap of fiber cement around the core material.

Examples of preferred multifunctional embodiments or products are described below.

a. Fire+Cladding or Substrate

An example of a preferred product combines the desirable properties of fiber cement with a fire resistive core material such that the composite attains a fire rating equivalent to type X gypsum wallboard when tested to ASTM E 119 for interior and exterior wall and ceiling assemblies. The advantage of this material is that it provides both fire resistance and a durable exterior surface in a single product. Traditional systems require multiple building products to attain equivalent functionality, such as the combination of a type X gypsum wallboard and an exterior cladding.

b. Thermal Insulation+Cladding or Substrate

Another example of a preferred product combines the desirable properties of fiber cement with a thermal insulating core material to achieve higher R-values when tested in accordance with ASTM C-177. The advantage of this material is that it provides both thermal insulation and a durable exterior surface to the structure. Traditional systems require a combination of building products to attain equivalent functionality, such as the combination of a foam plastic thermal insulation panel and an exterior cladding.

c. Fire+Thermal Insulation+Cladding or Substrate

Another example of a preferred product combines the desirable properties of fiber cement with a thermal insulating core material to achieve higher R-values when tested in accordance with ASTM C-177, and also achieves a fire resistive rating equivalent to ⅝" thick type X gypsum wallboard. The advantage of this composite material is that it provides a fire resistive material, a thermal insulating material, and a durable exterior surface to the building assembly. Traditional systems require multiple building products to attain equivalent functionality, such as the combination of a type X gypsum wallboard, a foamed plastic thermal insulation panel, and an exterior cladding.

d. Shear+Cladding or Substrate

Another example of a preferred product combines the desirable properties of fiber cement with the racking shear strength, tested in accordance with ASTM E 72, that is provided by fixing the composite material in a framed assembly. The advantage of this material is that it provides the necessary shear strength in an assembly that has a durable exterior surface that is non-combustible and has low surface burning characteristics (when tested to ASTM E 84). Traditional systems such as APA Rated Sheathing and Siding are combustible and have higher surface burning characteristics.

e. Shear+Fire+Cladding or Substrate

Another example of a preferred product combines the desirable properties of fiber cement with a fire resistive core to achieve a fire rating equivalent to type X gypsum wallboard with adequate racking shear strength. The advantage of this material is that it provides shear strength, fire resistance, and a durable exterior surface in a single building product. Traditional systems require multiple building products to attain equivalent functionality, such as the combination of a type X gypsum wallboard and an APA Rated Sheathing or Siding.

f. Ability to Mold Shapes for Cladding or Trim or Decorative Substrates

Another example of a preferred product combines the desirable properties of fiber cement with the moldability of the thin, preformed, fiber cement green sheet to form architecturally desirable shapes. The advantage of this material is that it provides a profiled or shaped building product without the need for post-curing machining. Traditional profiled fiber cement is costly due to machining and tooling costs and the costs associated with the control and disposal of the dust generated from machining. Thicker, lightweight, and more complex shapes can be made with these composites compared to traditional fiber cement.

3. Overview of Other Sandwich Composite Embodiments

Having described preferred embodiments above, this section provides further description of sandwich composites, including those encompassed by the preferred embodiments, as compared to other traditionally known types of sandwich composites.

Generally, high strength-to-weight ratios can be attained using a sandwich composite design combining high tensile strength skins with a lightweight, rigid core. Products using this type of design include aircraft wings, surfboards, boat hulls, cool-room panelized walls, and hollow-core doors. Sandwich composite building panels include paper-faced and fiberglass-mat-faced gypsum wallboards, fiberglass-scrim-reinforced cementitious tile backing boards and sheathing, and fiberglass-mat-faced gypsum backing boards.

a. Common Building Materials

Some common building materials have multi-layer construction, such as plywood and fiber cement sheets. The composition and structure of each layer in these particular multi-layer materials is predominantly the same. Most fibrous reinforcement is directional or oriented within each layer, causing the physical properties of the composite to be directional. For example, the tensile strength of the composite is greater in the planar (layer) direction of the material than in the direction perpendicular to the layers. The layers can be positioned so that the composite has all its layers aligned in the oriented direction, such as with fiber cement, or with alternating layers aligned at right angles, such as with plywood. Aligning of adjacent, oriented layers at right angles greatly reduces the directionality in the composite properties.

Sandwich composites normally contain at least three primary layers and are typically constructed of outer skins or facings covering relatively lightweight cores. The facing material of sandwich composites is usually chosen to impart strength to the composite. Exterior durability and moisture resistance frequently are not inherent properties of the high-strength skins. Fiber cement skins provide moisture resistance and durability that are desired for exterior building products such as siding, wall panels, trim, soffit, shingles and roofing tiles. High strength and low weight composites are desired for ease of installation of building products. This enables large sheets to be handled without excessive physical exertion and without the sheet breaking in bending. Additions of foam and/or lightweight fillers to the core mix of the sandwich composite reduce the overall weight of the composite.

b. Sandwich Composite Design Considerations

A sandwich composite structure, employing a lightweight core and relatively high tensile strength skins or facings, allows composite materials to be made thick enough to impart structural rigidity without rendering the product too heavy for ease of handling. The flexural strength of the composite is determined mainly by the tensile strength of the skins as long as the strength of the bonded interface between the skins and core is adequate. Failure due to bending of a sandwich composite can occur in three distinct ways. The face in tension may fracture, the face in compression may buckle and/or delaminate from the core, or the core may fail under shear load. Failure under shear load can occur either close to the interface of the core and skin, or within the core itself. Good interfacial bonding between the core and skins is needed when using lightweight core materials that commonly have high pore volumes.

c. Facing Materials of Building Material Sandwich Composites

Facing materials, or skins, are generally in the form of planar materials, comprised of sheets, mats, plates, films, and coatings. These facings can be made from substances such as metals, plastics, wood, paper, organic or inorganic fibers, and cementitious materials. Facing materials used for sandwich composite building materials as described herein include paper sheets, fibrous mats, fiber-reinforced cement (FC), and fiber-mat reinforced cement (FMC).

(1) Performance of Facing Materials in Moist Environments

The wet and dry strengths of a typical gypsum paper are compared to cellulose fiber cement made by the Hatschek process in Table 1 below. When dry, the gypsum paper has almost seven times the strength of the fiber cement. However, when the facings were saturated with water, the gypsum paper had less than 3% of its original strength, whereas the fiber cement retained about two-thirds of its dry strength.

TABLE 1

| Facing Material | Tensile Strength | |
|---|---|---|
| | Dry, MPa | Wet, MPa |
| Gypsum Paper (0.014" thick) | 40 | 1 |
| Fiber cement (0.068" thick) | 6 | 4 |

The papers used as facing materials are quite strong when dry, but lose almost all of their strength when exposed to wet environments. Water repellant additions to the paper improve the water resistance, but prolonged exposure to moisture can still result in degradation of the core-paper bond strength and the paper tensile strength. This can eventually lead to delamination of the paper from the core, and/or failure of the core material under minimal bending, shear or tensile loads.

(2) Surface Abuse Resistance of Facing Materials

Building materials such as wallboards are often subject to human traffic and it is desirable for the surface of building materials to have abuse resistance. Fiber cement has surface abuse resistance that is far superior to that of common paper-faced building materials such as gypsum wallboard. One measure of abuse resistance is the resistance of the surface to wear or loss of material from abrasion caused by people or equipment colliding with the surface of the wall. The surface abrasion resistance of fiber cement and gypsum wallboard was measured using the ASTM D4977 test method, modified using a 25-lb. load on a steel brush. The abrasion depth was measured after 50 cycles and found to be 1.75 mm for the gypsum wallboard, compared to <0.01 mm for the fiber cement wallboard.

(3) Flame and Fire Spread of Facing Materials

Another concern when designing and selecting building materials is the resistance of the surface of the material to promoting the spread of a fire and to supply fuel to a fire in a building. The surface fire resistance of paper-faced building products is poor compared to cement-based or inorganic-based materials due to the combustibility of the wood fiber in the paper facing.

(4) Fibrous-Mat Facings

When fibrous mats are used on wallboards, sheathing, and backing boards, they are usually made from uncoated or coated fiberglass. Fibrous mats can be either nonwoven (veils) or woven (scrims), and are composed of either chopped or continuous fibers. Scrims are generally more expensive than veils, but typically are stronger and more durable. Fibrous mats are more durable than paper facings. Although paper facings are generally stronger when dry, fibrous mats have much higher wet strengths. ASTM C1154-99 defines fiber-mat reinforced products (FMC) as "manufactured thin section composites of hydraulic cementitious matrices and non-asbestos fibers in two-dimensional scrims".

(a) Non-Woven Fiberglass-Mat Facings

Fiberglass mats have been used to improve the moisture and fire resistance of gypsum board products. However, the composites are still susceptible to deterioration after prolonged exposure to moisture due to the solubility of gypsum in water. This can gradually reduce the strength of the core and of the mat-core interface. Another concern with fiberglass mat facings is skin irritation from handling the composites. The glass fibers contained in the mats are typically less than 0.001 inch in diameter and can fracture and become embedded in skin that comes into contact with the mats during handling. These embedded pieces of fiberglass cause irritation of the skin. Polymeric coatings have been claimed to further improve the water resistance of both paper and fiberglass facings. Such coatings generally slow the rate of water permeation into the core material.

(b) Fiberglass Scrims

Fiberglass scrims are used to reinforce board products such as Portland cement-based ceramic tile backing boards. However, the durability of fiberglass scrims made from A-glass (soda-lime-silica) or E-glass (borosilicate) is greatly reduced when they are used in materials and building systems containing portland cement. The fiberglass is attacked in the highly alkaline environment of the portland cement and loses strength. The actual mechanisms are not well understood, but the attack commences with the formation of an alkali silicate gel. The glass fibers are relatively reactive due to a high specific surface (small diameter and high aspect ratio), and loss of structural mass to gel formation can quickly reduce the strength. To overcome this, the fiberglass must be coated with a polymeric material such as polyvinyl chloride to resist composite degradation in a wet environment. Another solution is to use fiberglass scrims made from alkali-resistant (AR) fibers. These fibers are composed of a soda-lime-silica glass containing a minimum of 16 wt % zirconia. The addition of the zirconia significantly increases the cost of the fiberglass. Thus using coated fiberglass scrims is considerably less expensive than using alkali-resistant fiberglass scrims. Another concern with the use of fiberglass scrims is that the surface of the board will not be smooth unless the scrim is completely embedded into the core, or a suitable surface coating is applied.

(5) Fiber Cement Facings

ASTM C1154-99 defines fiber cement (FC) products as "manufactured thin section composites of hydraulic cementitious matrices and discrete non-asbestos fibers". Fiber-mat reinforced cement products (FMC) are defined in ASTM C1154-99 as "manufactured thin section composites of hydraulic cementitious matrices and non-asbestos fibers in two-dimensional scrims".

Portland cement-based, fiber cement (FC) and fiber-mat reinforced cement (FMC) facings are used in composite materials that have been developed for applications such as wall panels (King, U.S. Pat. No. 5,002,620 and Cottier et al., Australian Patent No. 661,704), trim boards (Gnatowski et al., U.S. Pat. No. 5,693,409), and various structural materials. Two general types of these facings are used: 1) those manufactured (prefabricated and cured) prior to assembly of the composite and 2) those formed from uncured material, in situ, as part of a sequentially layered composite. No prior art has been found in which continuous, preformed, uncured fiber cement facings have been used to manufacture sandwich composites as described above in the preferred embodiments.

(a) Prefabricated and Cured Fiber Cement Facings

Prefabricated and cured fiber cement facings are used to form both cast-in-place and molded composites greater than 1½" thick. The cast-in-place composites, such as structural walls, panels, beams, girders, and joists, use prefabricated, cured sheets as rigid frameworks into which the cores are cast (Jones, Jr., U.S. Pat. No. 5,473,849). The composites are not designed to be installed onto a supporting wall framing like most wallboards or wall sheathings, but instead span from floor to ceiling, like partition composite wall panels. The method of forming this composite is similar to pouring concrete between formwork sheets, except the fiber cement facings (analogous to the formwork) are permanent in this case. The art of forming such composites requires the fiber cement skin to be thick enough to be handled without damaging the panel and strong enough to withstand the hydrostatic pressures generated from the core mix during casting of the core. The fiber cement facings are $\geq 3/16$" thick to provide sufficient strength for processing the composite. There is also preferably a good bond between the facings and core, whereas formwork is intended to have negligible bonding to the concrete so that it can be removed and reused. A similar method uses a mold to form building panel composites (Cottier, et al., Australian Patent No. 661,704). The core is cast onto a cured fiber cement facing sheet and then covered with a top fiber cement facing sheet.

(b) Co-formed Fiber Cement Sandwich Composites

The three classifications that are used to describe the different reinforced composite building products in ASTM C 1154-99 are cement-bonded particle board, fiber cement and fiber-mat reinforced cement.

Uncured cement-bonded particle board and fiber-mat reinforced cement (FMC) facings are formed in-place as part of composites that are fabricated from sequentially deposited layers. The skins and the core are co-formed in one process to produce the sandwich composite. The bottom facing material is formed first, followed by the core material, and then the top facing material. These composites can be continuously formed monoliths that are cut and trimmed to size, or individually molded to the desired size. The core and skin materials can be slurries of different compositions that are cast or sprayed, or granular materials that are pressed to consolidate the composite.

An example of a co-formed sandwich material is described in U.S. Pat. No. 5,693,409 to Gnatowski et al. This material is processed by a sequential deposition of layers and describes facing layers as fiber cement. The description of fiber cement used in Gnatowski is different from the fiber cement of the preferred embodiments above, which is the same as the description given in ASTM C1154-99. The difference in the materials, which are both described as fiber cement, is that in certain preferred embodiments and ASTM C1154-99, the fibers are discrete, individualized fibers, whereas the reinforcing fibers in U.S. Pat. No. 5,693,409 are described as chips or strands of wood fiber. The wood strands are described as greater than 10 mm in length. Wood strands of this length would be better described as thin sections of wood comprising fibers naturally bound by lignin. Wood strands or wood chips in cementitious matrices are more typically described as cement-bonded particle board, which is defined as "manufactured flat sheets of hydraulic cementitious matrices and fibrous wood particles" in ASTM C 1154-99. The external durability of cement-bonded particle board is poor due to the swelling of the wood strands within the intrinsically brittle cement matrix. This swelling can lead to microcracking within the cement matrix, which lowers the durability by reducing the strength and increasing the permeability of the board.

Another example of a method to produce a co-formed, 3-layer composite is described by King in U.S. Pat. No. 5,002,620. The two outer layers are formed with relatively dense, fiber-reinforced concrete, and the core is made with a lightweight, fiber-reinforced concrete. In this method, the core concrete density is modified by addition of gas bubbles to the core material. The concrete core is comprised of portland cement, suitable aggregates, a fibrous reinforcing material, ash from refuse-derived fuel, expanded silicate, water, sand, a suitable foaming agent, a source of compressed gas, and a suitable vapor barrier resin for use in bonding and moisture resistance. The layers are formed by sequential casting into a mold from hoppers. The fibrous material in the facing layers is therefore distributed in a random orientation with no intentional orientation of the fibers in the plane of the material parallel with the plane of the layers. The composite layers are made with concrete. Concrete generically has coarse and fine aggregates in the composition. The fine aggregate is sand and the coarse aggregate is predominantly retained on a 4.75 mm (No.4) sieve as defined in ASTM C 125-96. In order to attain good tensile strength in the facing layers, the effective thickness of the facing layers must be significantly greater than the coarse aggregate size.

d. Core Materials

Cores can be made lightweight by incorporating large volumes of voids or lightweight materials into a monolithic, cementitious material, or by constructing a core with an open reinforcing framework that defines large voids. Most composites use the first method and the cores contain large volumes of foam or sufficient quantities of low-density fillers to yield a relatively lightweight composite. The most common method of adding large volumes of voids to a core slurry is by mixing it with foam generated using a foaming agent. This results in a randomly distributed multitude of small pores. Cellular concrete is a typical core material and is defined in ASTM C 125-96 as lightweight, hydraulic cement having a homogenous void or cell structure attained using gas-forming chemicals or foaming agents. The foam, fillers, and admixtures needed for the desired core properties can be bound together by either organic (polymeric) or inorganic binders. The most common type of binder used in building materials is an inorganic, hydraulic binder. The most common and economical inorganic, hydraulic binders are gypsum and Portland cement.

(1) Structural Open-Framed Cores

The second method of producing lightweight cores involves the use of an open reinforcing framework. The core is made from a strong material in a shape and orientation that structurally reinforces and supports the facing materials. The objective is to create the strength and stability of a monolithic sandwich composite using an open structural design that incorporates large volumes of void space to reduce the composite weight. Such structural designs include open honeycombs and corrugations.

(2) Core Compositions

Typical admixtures for cementitious core slurries include viscosity modifiers, accelerators, retarders, foaming agents, dispersing agents, and additives to improve moisture and fire resistance. Lightweight aggregates or fillers are used in addition to or in place of foaming agents to reduce core density. Lightweight fillers include expanded minerals such as perlite, vermiculite, shale, and clay, expanded polystyrene spheres, and fly ash. Moisture resistant additives used individually or in combination in gypsum cores include emulsions of wax and/or asphalt, polyvinyl alcohol, siloxane emulsion, and metallic soaps. Films or resinous coatings formed by such materials as styrene-acrylic latex are used to further improve moisture resistance and surface quality. Additions used to improve fire resistance include gypsum, mineral fibers such as glass and wollastonite, mineral additives such as unexpanded vermiculite, mica, hydrated alumina, bauxite, clay, and combinations of thereof.

4. Advantages of Sandwich Composites made with Pre-formed, Uncured Fiber Cement Facings One advantage of using a fiber cement facing as described herein is that it provides a smooth surface compared to fiberglass-mat-faced composites. For exterior products, the smooth surface of fiber cement provides a better surface for painting than wood products, where the shrinkage of the wood around the grain leads to cracking of the paint. The green fiber cement facing can also be molded or formed, using a flat plate press or roll-pressure process, into a textured surface to give an architectural finish, such as a woodgrain or stucco look, to the product. Scrim-faced sandwich panels function primarily as substrates for other materials and do not provide finished surfaces. Fiberglass-mat-faced composites contain small-diameter glass fibers that can cause skin irritation when the composites are handled during delivery and installation. Paper-faced gypsum wallboards often have textures printed on the paper to serve as a finished surface, but this surface texture has little depth compared to fiber cement textures, and does not have exterior durability.

The surface porosity and surface texture of unpatterned fiber cement is less noticeable than that of fiberglass-mat-faced cement boards. The fiberglass-mat facing materials have an open weave or open structure that provides little resistance to water permeation into the core material. The fiber cement facing, by comparison, provides a superior barrier to water permeation into the core material and is a more continuous material than fiberglass mats and scrims. The permeation of water into the surface of fiber cement material is significantly less than fiberglass-faced cement boards. A 4-ft pressure head of water against the surface of fiber cement through a 2" diameter tube allows only 1/10 the volume of water to permeate into the surface of the fiber cement board compared to fiberglass-mat-faced cement boards.

Fiber cement is non-combustible and has a very low flame spread, but does not have fire performance equal to gypsum wallboard in fire-rated wall systems. Common steel-framed partition walls, or wood-framed walls, lined with 5/8" thick Type X gypsum wallboard on both sides of the framing, achieve a one-hour fire resistance rating when tested in accordance with ASTM E 119 and installed as per the Gypsum Association Fire Resistance Design Manual GA FILE No. WP 1200 and WP 3520, respectively. A similar wall system with fiber cement on one side and 5/8" thick Type X gypsum wallboard on the other side, as described in GA FILE No. WP 1296, requires the wall cavity to be insulated with mineral fiber to achieve a one-hour fire resistance rating. This type of installation therefore results in higher costs, requiring extra materials and more time to install. This insulated wall does have the advantage of providing a fiber cement surface to one side of the wall that can be used in high traffic areas subject to abuse, or as a substrate for ceramic tiles. Preferred embodiments of the current invention describes a superior product that provides a fiber cement building board composite material that can achieve the fire resistance performance of gypsum wallboard and also the abuse resistance, moisture resistance, and durability of fiber cement.

In general, prior art sandwich composites utilizing fiber cement skins on both sides of a lightweight core were limited to using a thickness of material that could be handled and formed into a composite. The skins were greater than or equal to about 3/16" in thickness and were cured to provide sufficient strength for handling and forming into the composite material. This product was formed into thicknesses of 1½" or greater to span from floor to ceiling as full wall panels or wall partitions. The preferred embodiments described above are an improvement on this prior art because thinner skins of fiber cement are used to form the sandwich composite. This is achieved without having the handling problems of the prior art because the thin fiber cement skins are formed into the sandwich composite in a green sheet form that is plastic and uncured. The plastic nature of the skin during formation of the composite provides improved design flexibility to enable forming flat surfaces, textures, and profiled forms of the composite. The thin fiber cement skins also allow a lighter weight and thinner composite material to be produced that can be attached to wall framing in full sheets typical of gypsum wallboards and wall sheathing. An overall lighter weight composite is achieved because more of the lightweight core is used in a given board thickness due to the use of thinner skins.

Thus, the fiber cement sandwich composite of the preferred embodiments provides a lightweight wallboard/sheathing composite that is easy to handle, to nail, to score-and-snap, and that has the strength, durability, moisture resistance, and abuse resistance of fiber cement, along with the thermal insulation and fire resistance of gypsum.

It should be understood that certain variations and modifications of this invention will suggest themselves to one of ordinary skill in the art. The scope of the present invention is not to be limited by the illustrations or the foregoing descriptions thereof, but rather solely by the appended claims.

What is claimed is:

1. A building material, comprising:
   a first component, wherein the first component comprises a pre-formed fiber cement layer having a density of between about 53 to 115 lb/ft$^3$ and a fiber content between about 5–12 wt. %;
   a second component positioned adjacent the first component, wherein at least a portion of the components forms interpenetrating mechanical and chemical bonding with the other components; and
   wherein the fibers of the first component extend in a substantially planar orientation substantially parallel to a surface of the pre-formed fiber cement layer.

2. The building material of claim 1, wherein the first component is reinforced with individualized cellulose fibers, wherein at least a substantial portion of the lignin components are removed from the fiber cell walls.

3. The building material of claim 1, wherein the thickness of the first component is less than about 3/16 inch.

4. The building material of claim 1, wherein the density of the first component is higher than the density of the second component.

5. A building material, comprising:
   a first component wherein the first component comprises a pre-formed fiber cement layer comprising about 5–12 wt. % cellulose fibers, wherein the cellulose fibers of the first component extend in a substantially planar orientation substantially parallel to a surface of the pre-formed fiber cement layer; and
   a second component positioned adjacent the first component, wherein at least a portion of one of the components is bonded to the other component.

6. The building material of claim 5, wherein the second component is made of a curable material.

7. The building material of claim 6, wherein at least a portion of the second component penetrates the pre-formed fiber cement layer so as to form mechanical and chemical bonding therebetween.

8. The building material of claim 6, wherein at least a portion of the second component extends into the capillary network of the pre-formed fiber cement layer so as to reduce the permeability of the pre-formed fiber cement layer.

9. The building material of claim 5, wherein the second component is fiber reinforced.

10. The building material of claim 5, wherein one of the components at least partially surrounds the other component.

11. The building material of claim 5, further comprising a third component provided adjacent said first component such that the first component is located between the second component and the third component.

12. The building material of claim 5, wherein the fibers contained in the first component are selected from the group consisting of natural inorganic fibers, synthetic fibers, engineered fibers, cellulose fibers, and combinations thereof.

13. The building material of claim 5, wherein the second component is a fire resistive material.

14. The building material of claim 5, wherein the fiber cement of the first component is pressed.

15. The building material of claim 5, wherein the fiber cement of the first component is embossed.

16. The building material of claim 5, further comprising a sub layer between the first component and the second component to improve bonding therebetween.

17. The building material of claim 5, wherein the second component is a lightweight core having a first side and a second side, and the first component is a pre-formed fiber cement facing on at least the first side of the core.

18. The building material of claim 17, wherein the fiber cement facing wraps around both the first side and the second side of the core.

19. The building material of claim 17, wherein the core is open.

20. The building material of claim 17, wherein the core is homogeneous.

21. The building material of claim 19, wherein the core has a honeycomb configuration.

22. The building material of claim 5, wherein the building material is a single plank.

23. The building material of claim 5, wherein the building material is trim board.

24. A building material, comprising:
at least a first component and a second component provided adjacent said first component, wherein the second component comprises a lightweight core having a first side and a second side, and the first component comprises a pre-formed fiber cement facing on at least the first side of the core, wherein the core includes a plurality of vertical symmetrically opposed corrugated core layers.

* * * * *

UNITED STATES PATENT AND TRADEMARK OFFICE
CERTIFICATE OF CORRECTION

PATENT NO. : 6,941,720 B2
DATED : September 13, 2005
INVENTOR(S) : Harvey Dale DeFord et al.

It is certified that error appears in the above-identified patent and that said Letters Patent is hereby corrected as shown below:

Title page,
Item [56], References Cited, U.S. PATENT DOCUMENTS, delete "Petalowski" and insert -- Pelatowski --.

Column 2,
Line 23, delete "Faza et al." and insert -- Kaiser et al. --.

Column 3,
Line 12, delete "preformed" and insert -- pre-formed --.

Column 6,
Line 3, after "FIBERS" add -- , --.

Column 9,
Line 6, delete "Layers," and insert -- Layer, --.

Column 10,
Line 43, delete "preformed," and insert -- pre-formed, --.

Column 22,
Line 19, after "is" add -- a --.

Signed and Sealed this

Thirteenth Day of June, 2006

JON W. DUDAS
*Director of the United States Patent and Trademark Office*